United States Patent
Bush

(10) Patent No.: US 10,447,606 B2
(45) Date of Patent: Oct. 15, 2019

(54) TIME-SENSITIVE NETWORKING DIFFERENTIATION OF TRAFFIC BASED UPON CONTENT

(71) Applicant: General Electric Company, Schenectady, NY (US)

(72) Inventor: Stephen Francis Bush, Latham, NY (US)

(73) Assignee: General Electric Company, Schenectady, NY (US)

( * ) Notice: Subject to any disclaimer, the term of this patent is extended or adjusted under 35 U.S.C. 154(b) by 122 days.

(21) Appl. No.: 15/485,982

(22) Filed: Apr. 12, 2017

(65) Prior Publication Data
US 2018/0302331 A1    Oct. 18, 2018

(51) Int. Cl.
*H04L 12/28* (2006.01)
*H04L 12/841* (2013.01)
*H04L 12/851* (2013.01)
*H04L 12/743* (2013.01)

(52) U.S. Cl.
CPC .......... *H04L 47/28* (2013.01); *H04L 47/2441* (2013.01); *H04L 45/7457* (2013.01)

(58) Field of Classification Search
CPC ..... H04L 12/56; H04L 2012/56; H04L 47/34; H04L 1/1841
See application file for complete search history.

(56) References Cited

U.S. PATENT DOCUMENTS

| | | | |
|---|---|---|---|
| 6,658,485 B1 | 12/2003 | Baber et al. | |
| 7,002,977 B1 * | 2/2006 | Jogalekar | H04L 45/00 370/389 |
| 7,149,187 B1 * | 12/2006 | Jacobson | H04L 47/10 370/235 |
| 7,548,512 B2 | 6/2009 | Sexton et al. | |
| 7,602,710 B2 | 10/2009 | Grippo et al. | |
| 7,720,013 B1 * | 5/2010 | Kelliher | H04L 43/00 370/202 |
| 7,936,770 B1 * | 5/2011 | Frattura | H04L 49/90 370/351 |
| 8,842,534 B2 | 9/2014 | Hahn et al. | |
| 9,456,453 B2 | 9/2016 | Zellner et al. | |

(Continued)

OTHER PUBLICATIONS

Yu, Cheng-Chi et al., "Dynamic Scheduling of Real-Time Messages Over an Optical Network", Proceedings of Sixth International Conference on Computer Communications and Networks, Sep. 22-25, 1997, (pp. 336-339, 4 total pages).

(Continued)

*Primary Examiner* — Siren Wei

(74) *Attorney, Agent, or Firm* — Buckley, Maschoff & Talwakar LLC

(57) ABSTRACT

According to some embodiments, system and methods are provided, comprising receiving one or more data frames at a Time Sensitive Network (TSN) module; determining a classification for each data frame via the TSN module; generating a schedule for the one or more data frames to transmit the data frame through a communication network based on the classification; transmitting the one or more data frames based on the schedule; and controlling one or more operations of an installed product based on the transmitted one or more data frames. Numerous other aspects are provided.

28 Claims, 5 Drawing Sheets

(56) References Cited

U.S. PATENT DOCUMENTS

| | | | |
|---|---|---|---|
| 2002/0095493 A1* | 7/2002 | Byrnes | H04L 45/02 709/224 |
| 2003/0045285 A1 | 3/2003 | Parkman | |
| 2007/0041364 A1* | 2/2007 | Kakadia | H04L 45/00 370/352 |
| 2008/0077705 A1* | 3/2008 | Li | H04L 47/10 709/236 |
| 2008/0112439 A1* | 5/2008 | Vestal | H04J 3/0661 370/516 |
| 2011/0317587 A1 | 12/2011 | Lida et al. | |
| 2012/0072380 A1 | 3/2012 | Liu et al. | |
| 2013/0223446 A1 | 8/2013 | Ernström | |
| 2015/0178034 A1* | 6/2015 | Penilla | G06F 3/04842 345/1.1 |
| 2015/0230274 A1 | 8/2015 | Sharma et al. | |
| 2016/0021017 A1 | 1/2016 | Thubert et al. | |
| 2016/0112308 A1 | 4/2016 | Ficara et al. | |
| 2016/0191572 A1* | 6/2016 | Joy | H04L 12/413 370/402 |
| 2017/0012895 A1* | 1/2017 | Zhao | H04L 47/724 |
| 2018/0048578 A1* | 2/2018 | Rollet | H04L 43/026 |
| 2018/0203959 A1* | 7/2018 | Refsnaes | G01M 5/0041 |

OTHER PUBLICATIONS

Jin, Guojun et al., "Control Transmission Pace At IP Layer to Avoid Packet Drop", 2004 IEEE International Workshop on IP Operations and Management, Oct. 11-13, 2004, (pp. 60-66, 7 total pages).

Jamshed, Muhammad Ali et al., "An Energy Efficient Priority Based Wireless Multimedia Sensor Node Dynamic Scheduler", 2015 12th International Conference on High-capacity Optical Networks and Enabling/Emerging Technologies (HONET), Dec. 21-23, 2015, (pp. 1-4, 4 total pages).

International Search Report and Written Opinion issued in connection with corresponding PCT Application No. PCT/US2018/026403 dated Jul. 27, 2018.

* cited by examiner

TIME-SENSITIVE NETWORKING DIFFERENTIATION OF TRAFFIC BASED UPON CONTENT

BACKGROUND

Industrial equipment or assets, generally, are engineered to perform particular tasks as part of industrial processes. For example, industrial assets may include, among other things and without limitation, manufacturing equipment on a production line, aircraft engines, wind turbines that generate electricity on a wind farm, power plants, locomotives, healthcare or imaging devices (e.g., X-ray or MRI systems) or surgical suites for use in patient care facilities, or drilling equipment for use in mining operations. The design and implementation of these assets often takes into account both the physics of the task at hand, as well as the environment in which such assets are configured to operate and the specific operating control these systems are assigned to. Various types of control systems communicate data between different sensors, devices, user interfaces, etc. in order to enable control operations of other powered systems.

The operations of these powered systems may rely on on-time and accurate delivery of data frames among various devices. Failure to deliver some data at or within designated times may result in failure of the powered system, which may have disastrous consequences. For example, the failure to deliver sensor data to a control system of a locomotive or rail vehicle system may result in the locomotive or rail vehicle system not applying brakes early enough to avoid a collision. As another example, the failure to deliver sensor data to a control system of a surgical suite may result in a delay of life-saving measures. Other control systems may fail to implement protective measures to avoid damage or injury to the systems or other equipment if data is not supplied at or within the designated times. Without timely information, feedback control systems cannot maintain performance and stability.

Some systems may use a time sensitive network (TSN) to communicate data. Communications within a TSN may be scheduled using a single device (e.g., an offline scheduling system) that assumes fixed, non-changing paths through the network nodes between communication devices. The TSN may also receive non-time sensitive communications, such as rate constrained communications and "best effort" communications. However, the communications received by the TSN for transmission through the network may not include any indication of whether they are a time-sensitive communication or a non-time sensitive communication. This makes it difficult to configure and schedule all TSN traffic flows in a network.

It would be desirable to provide systems and methods to improve communication traffic flow through a TSN network to optimize operational control of a powered system.

BRIEF DESCRIPTION

According to some embodiments, a method includes receiving one or more data frames at a Time Sensitive Network (TSN) module; determining a classification for each data frame via the TSN module; generating a schedule for the one or more data frames to transmit the data frame through a communication network based on the classification; transmitting the one or more data frames based on the schedule; and controlling one or more operations of an installed product based on the transmitted one or more data frames.

According to some embodiments, a system includes an installed product, including a plurality of components; a computer programmed with a Time Sensitive Network (TSN) module for the installed product, the TSN module for controlling operations of the installed product; the computer including a processor and a memory in communication with the processor, the memory storing the TSN module and additional program instructions, wherein the processor is operative with the TSN module and additional program instructions to perform functions as follows: receiving one or more data frames at a Time Sensitive Network (TSN) module; determining a classification for each data frame via the TSN module; generating a schedule for the one or more data frames to transmit the data frame through a communication network based on the classification; transmitting the one or more data frames based on the schedule; and controlling one or more operations of the installed product based on the transmitted one or more data frames.

According to some embodiments, a non-transitory, computer-readable medium storing instructions that, when executed by a computer processor, cause the computer processor to perform a method comprising: receiving one or more data frames at a Time Sensitive Network (TSN) module; determining a classification for each data frame via the TSN module; generating a schedule for the one or more data frames to transmit the data frame through a communication network based on the classification; transmitting the one or more data frames based on the schedule; and controlling one or more operations of an installed product based on the transmitted one or more data frames.

A technical effect of some embodiments of the invention is an improved and/or computerized technique and system for dynamically controlling a path of time-sensitive data and non-time-sensitive data through a network and a quality of service associated with the time-sensitive data, based upon the content of the data. Embodiments provide for traffic/data streams and quality of service that do not have to be tediously pre-configured, which may save time, labor and may reduce error. Embodiments provide for systems that do not have to be over-provisioned. Embodiments provide for a network that may adapt precisely to match the requirements of the data requirements, making a more efficient networked communication system. For example, real world benefits include a much less brittle system and a system with much less pre-configuration. Without this invention, each control system feedback path would have to be carefully and tediously specified by its location and route through a potentially complex communication network. Any changes to the control system or the communication network would likely break the timely feedback of information, the system would be "brittle." Embodiments provide for a system with much less pre-configuration, and a system that is less brittle because the content of the data is examined to determine whether it is time-critical. Embodiments allow for the control system and the communication to change, yet the time-critical data may continue to arrive within a required time bound. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DRAWINGS

DETAILED DESCRIPTION

Figure 1:
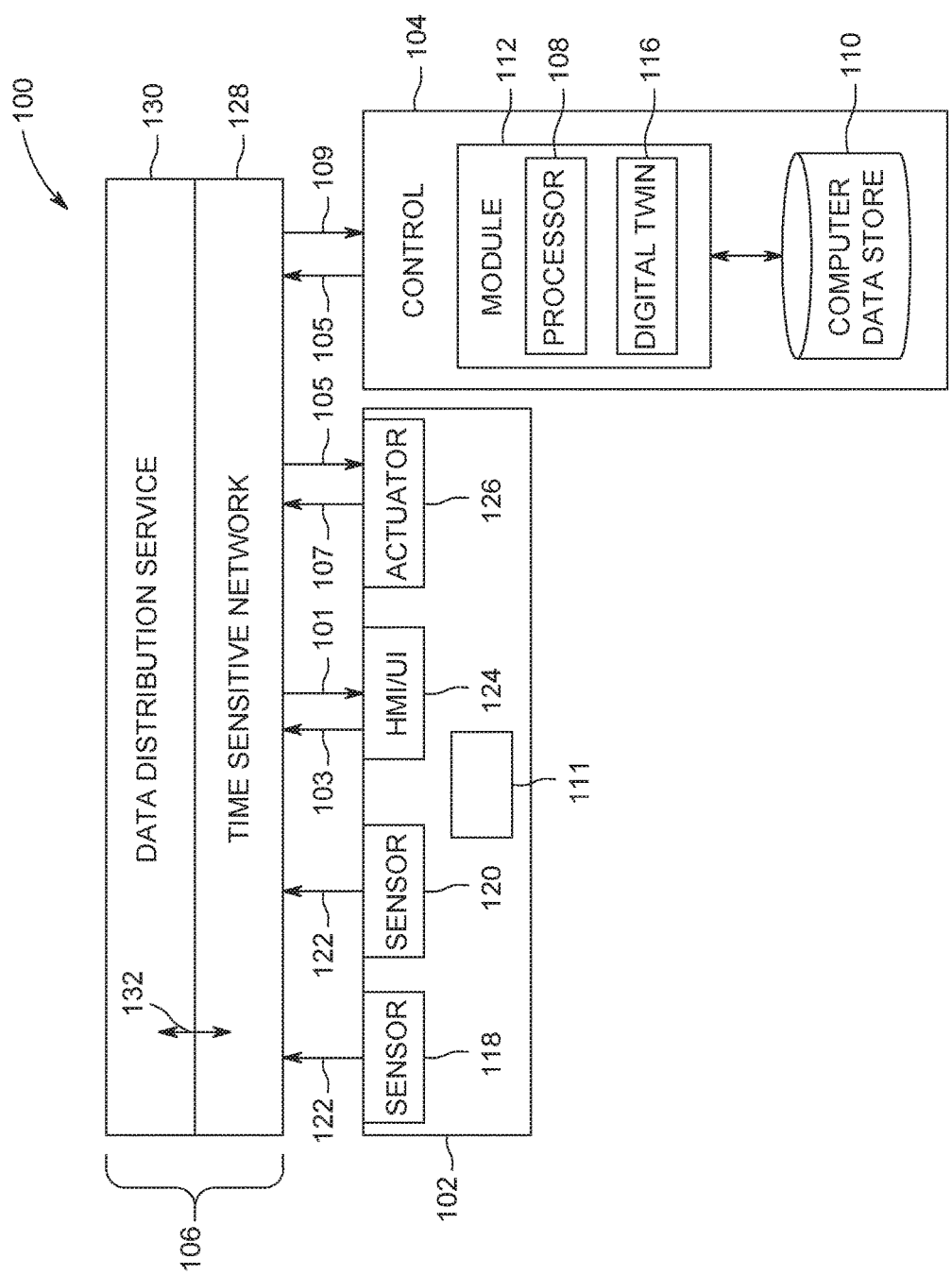
FIG. 1 illustrates a system according to some embodiments.

Various types of control systems communicate data between different sensors, devices, user interfaces, etc. as instructed by an application to enable control operations of powered systems. The operations of these powered systems may rely on on-time and accurate delivery of data frames among various devices. Failure to deliver some data at or within designated times may result in failure of the powered system, which may have disastrous consequences. Without timely information, feedback control systems cannot maintain performance and stability. As used herein a feedback control system may continuously receive feedback on a state of a dynamic system and may apply commands to an actuator or other device to maintain a desired outcome in the presence of "noise" (e.g., any random event that perturbs the system). In one more embodiments, the feedback control system may be a software-defined network control system. As used herein a software-defined network control system" is a control system operated over a digital communication network in which the data plane and control plane are distinct. The feedback control system may continuously receive feedback and make adjustments to maintain a desired state. In one or more embodiments, the performance of the system may depend upon the timely receipt of the state information. If state feedback information is delayed, the entire control system may become unstable and may go out of control, causing catastrophic behavior.

Some systems may use a time sensitive network (TSN) to communicate data associated with a particular application used in the control system. The TSN may be at least partially defined by a set of standards developed by the Time-Sensitive Networking Task Group, and includes one or more of the IEEE 802.1 standards. Time-sensitive communications within a TSN may be scheduled, while non-time sensitive communications, such as rate constrained communications and "best effort" communications may be unscheduled (e.g., transmitted without deterministic latency from end-to-end).

Conventionally, many communications are non-time sensitive communications and are transmitted in a "best effort" scenario. However, the communications received by the TSN for transmission through the network may not include any indication of whether they are a time-sensitive communication or a non-time sensitive communication. If the TSN is not aware of which communication has an associated schedule and which communication does not, it may make it difficult to configure all TSN traffic flows in a network and how they should be scheduled. For example, it is desirable for the TSN to distinguish between scheduled and un-scheduled communications so that the unscheduled communications can be fit into the flow of the scheduled communications through the network.

While application developers may go back into the application code and designate particular communications as scheduled, and provide a schedule for that newly-designated communication, it may be undesirable. For example, the application code may have been validated to some degree, and it may be undesirable to have to re-verify control loops executed per the application; in some instances the application developer may no longer be available to alter the application code.

In one or more embodiments, a TSN module is provided to label the communications (e.g., data frames) as scheduled or unscheduled, so that the TSN can appropriately schedule the data frame into the flow of communication traffic. The TSN module may, in one or more embodiments, analyze the data in each communication and compare the analyzed data to stored data to determine the appropriate label. In one or more embodiments, the data in each communication may include one or more patterns. In one or more embodiments, the stored data may include the one or more patterns, and one or more rules associated with each pattern. In one or more embodiments, the one or more rules may provide instructions to the TSN on how to direct the communication through the network.

The term "installed product" should be understood to include any sort of mechanically operational entity, asset including, but not limited to, jet engines, locomotives, gas turbines, and wind farms and their auxiliary systems as incorporated. The term is most usefully applied to large complex powered systems with many moving parts, numerous sensors and controls installed in the system. The term "installed" includes integration into physical operations such as the use of engines in an aircraft fleet whose operations are dynamically controlled, a locomotive in connection with railroad operations, or apparatus construction in, or as part of, an operating plant building, machines in a factory or supply chain and etc. As used herein, the terms "installed product," "asset," and "powered system" may be used interchangeably.

As used herein, the term "automatically" may refer to, for example, actions that may be performed with little or no human interaction.

Turning to FIG. 1, a block diagram of a system 100 architecture is provided according to some embodiments. The system 100 may include at least one installed product 102. As noted above, the installed product 102 may be, in various embodiments, a complex mechanical entity such as the production line of a factory, a gas-fired electrical generating plant, a jet engine on an aircraft amongst a fleet (e.g., two or more aircrafts or other assets), a wind farm, a locomotive, etc. The installed product 102 may include a control system 104 that controls operations of the installed product based on data obtained by, or generated by, and/or communicated among devices of the installed product, and communicates information between or among installed products, etc. to allow for automated control of the installed product, to provide information to operators of the installed product.

In one or more embodiments, the system 100 may include a communication system 106. The communications system 106 may be used by the control system 104 ("Control") to communicate data between or among devices of the control system 104 and/or the installed product 102 that is controlled by the control system 104. The control system 104 may represent hardware circuitry that includes and/or is connected with one or more processors 108 (e.g., microprocessors, integrated circuits, field programmable gate arrays, etc.) that perform operations to control the installed product 102.

In one or more embodiments, the control system 104 may include a computer data store 110 that may provide information to a Time Sensitive Network (TSN) module 112 and may store results from the TSN module 112. The communication system 106 may supply data from at least one of the installed product 102 and the data store 110 to the TSN module 112. The TSN module 112 may include a digital twin 116, and one or more processing elements 108. The processor 108 may, for example, be a conventional microprocessor, and may operate to control the overall functioning of the TSN module 112. In one or more embodiments, the processor 108 may be programmed with a continuous or logistical model of industrial processes that use the one or more installed products 102.

In one or more embodiments, the TSN module 112 may receive one or more data frames and then determine a classification for each received data frame. Based on the classification, the TSN module 112, in one or more embodiments, may first generate a schedule to transmit each data frame through the communication system 106, and then may transmit the data frames based on that schedule. In one or more embodiments, the control system 104 may control one or more operations of the installed product 102 based on the transmitted data frame(s).

In one or more embodiments, the data store 110 may comprise any combination of one or more of a hard disk drive, RAM (random access memory), ROM (read only memory), flash memory, etc. The data store 110 may store software that programs the processor 108 and the TSN module 112 to perform functionality as described herein.

The TSN module 112, according to some embodiments, may access the data store 110 and utilize the digital twin 116 to create a prediction and/or result (e.g., a predicted schedule) that may be transmitted back to the installed product 102 or to other systems (not shown), as appropriate (e.g., for display to a user, operation of the installed product, operation of another system, or input to another system).

In some embodiments, the communication system 106 may supply output from the TSN module 112 (and the elements included in the TSN module) to at least one of user platforms 124, back to the installed product 102, or to other systems. In some embodiments, signals received by the user platform 124, installed product 102 and other systems may cause modification in the state or condition or another attribute of one or more physical elements of the installed product 102.

The communication system 106 may communicate data between several devices of the installed product 102, such as sensors 118, 120 that monitor, measure, record, etc. information and communicate this information as sensor data 122. Another device that may communicate via the communications system 106 may include a human machine interface (HMI) or user interface (UI) 124 that receives output or status data 101 that is to be presented to a user or operator of the communication system 106 or control system 104 and that may communicate input data 103 received from the user or operator to one or more other devices of the control system 104. The HMI/UI 124 may represent a display device, a touchscreen, laptop, tablet computer, mobile phone, speaker, haptic device, or other device that communicates or conveys information to a user or operator. In accordance with any of the embodiments described herein, a user may access the system 100 via one of the HMI/UI 124 to view information about and/or manage the installed product 102.

In one embodiment, at least one of the sensors 118, 120 may be a camera that generates video or image data, an x-ray detector, an acoustic pick-up device, a tachometer, a global positioning system receiver, a wireless device that transmits a wireless signal and detects reflections of the wireless signal in order to generate image data representative of bodies or objects behind walls, sides of cars, or other opaque bodies, or another device.

Another device that may communicate using the communication system 106 includes one or more actuators 126, which may represent devices, equipment, or machinery that move to perform one or more operations of the installed product 102 that is controlled by the control system 104. Examples of actuators 126 include brakes, throttles, robotic devices, medical imaging devices, lights, turbines, etc. The actuators 126 may communicate status data 107 of the actuators 126 to one or more other devices of the installed product 102 via the communication system 106. The status data 107 may represent a position, state, health, or the like, of the actuator 106 sending the status data 107. The actuators 126 may receive command data 105 from one or more other devices of the installed product or control system via the communication system 106. The command data 105 may represent instructions that direct the actuators 126 how and/or when to move, operate, etc.

The control system 104 may communicate (e.g., receive, transmit, and/or broadcast) a variety of data between or among the devices via the communication system 106 at the behest of one or more software applications 111. For example, the control system 104 may communicate the command data 105 to one or more of the devices and/or receive data 109, such as status data 107 and/or sensor data 122, from one or more of the devices. While devices are shown in FIG. 1 as sending certain data or receiving certain data, optionally, the devices may send and/or receive other types of data. For example, the sensors 118, 120 may receive data and/or send other types of data.

Figure 2:
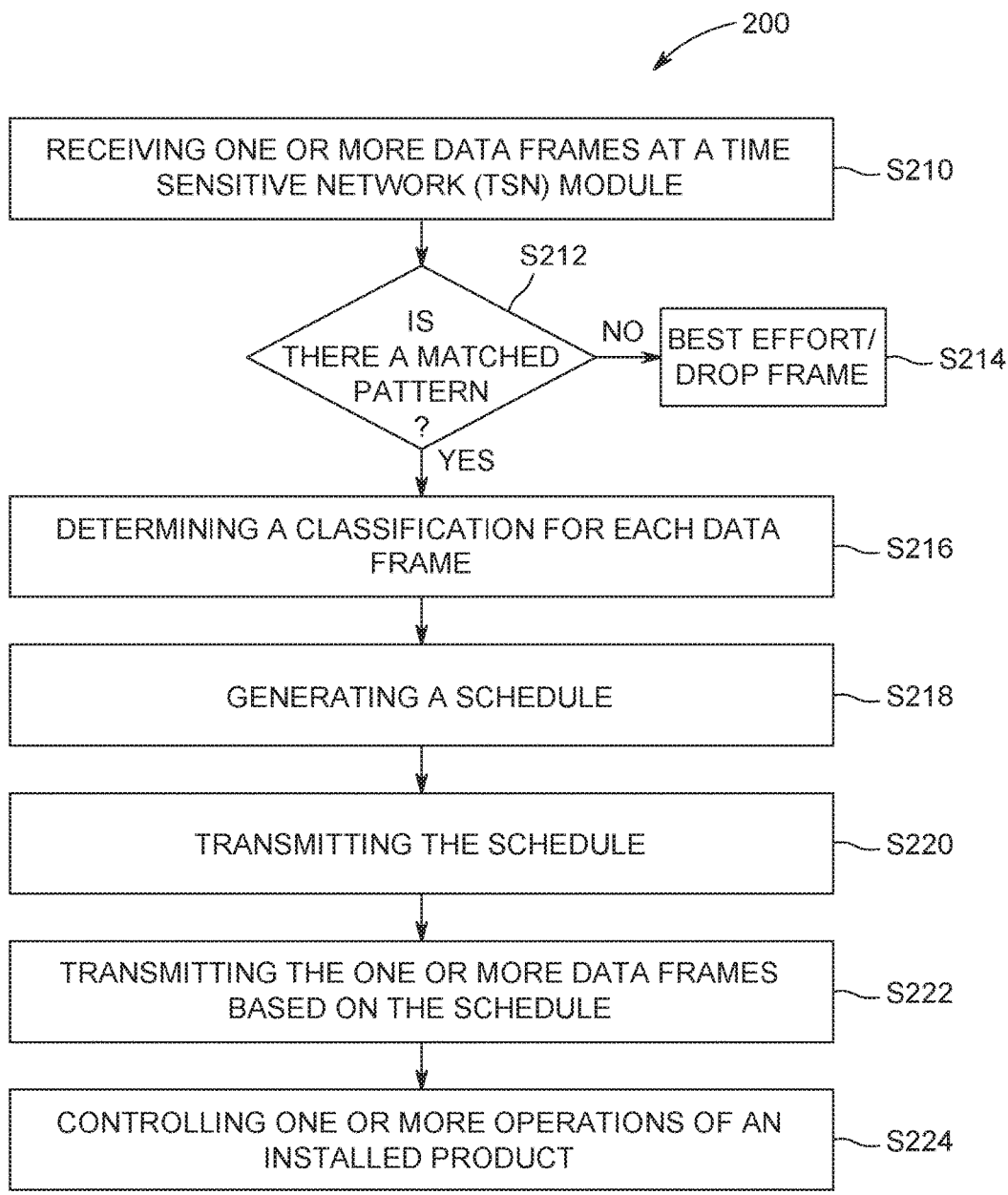
FIG. 2 illustrates a flow diagram according to some embodiments.

The communication system 106 communicates data between or among the devices and/or control system 104 using a communication network 128 that may communicate data using a data distribution service 130. As known in the art, the data distributions service 130 is a network "middleware" application that may make it easier to configure publishers and subscribers on a network. Other middleware applications may be used. In other embodiments, the data distribution service 130 is not included, and the application(s) 111 may manage the installed product 102 (and its devices) on its own. The network 128 (from FIG. 1) is shown in FIG. 2 as a time sensitive network, but alternatively may be another type of network. For example, devices, including those associated with the system 100 and any other devices described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The data distribution service 130 may represent an object management group (OMG) device-to-device middleware communication standard between the devices and the network. The data distribution service 130 may allow for communication between publishers and subscribers. The term publisher may refer to devices 104, 118, 120, 124, and 126 that send data to other devices 104, 118, 120, 124, 126 and the term subscriber refers to devices 104, 118, 120, 124, and 126 that receive data from other devices 104, 118, 120, 124, and 126. The data distribution service 130 is network agnostic in that the data distribution service 130 may operate on a variety of networks, such as Ethernet networks as one example. The data distribution service 130 may operate between the network through which data is communicated and the applications communicating the data (e.g., the devices 104, 118, 120, 124, and 126). The devices 104, 118, 120, 124, and 126 may publish and subscribe to data over a distributed area to permit a wide variety of information to be shared among the devices 104, 118, 120, 124, and 126.

In one embodiment, the data distribution service 130 is used by the devices 104, 118, 120, 124, and 126 to communicate data 101, 103, 105, 107, 109, 122 through the network 128, which may operate on an Ethernet network of the installed product. The network 128 may be at least partially defined by a set of standards developed by the Time-Sensitive Networking Task Group, and includes one or more of the IEEE 802.1 standards. While an Ethernet network may operate without TSN, such a network may be non-deterministic and may communicate data frames or packets in a random or pseudo-random manner that does not ensure that the data is communicated within designated time periods or at designated times. With a non-TSN Ethernet network there may be no way to know when the data will get to the destination or that it will not be dropped. This non-deterministic approach may be based on "best effort." As a result, some data may not reach devices connected via the non-TSN Ethernet network in sufficient time for the devices to operate using the data. With respect to some control systems, the late arrival of data may have disastrous consequences, as described above. A TSN-based deterministic Ethernet network, however, may dictate when certain data communications occur to ensure that certain data frames or packets are communicated within designated time periods or at designated times. Data transmissions within a TSN-based Ethernet network may be based on a global time or time scale of the network that may be the same for the devices in, or connected with, the network, with the times or time slots in which the devices communicate being scheduled for at least some of the devices.

The communication system 106 may use the network 128 to communicate data between or among the devices 104, 118, 120, 124, and 126 using the data distribution service 130 in order to maintain Quality of Service (QoS) parameters 132 of certain devices 104, 118, 120, 124, and 126. As used herein, QoS may refer to a time-sensitive networking quality of service. In one or more embodiments, the QoS parameters 132 of the devices 104, 118, 120, 124, and 126 may represent requirements for data communication between or among the devices 104, 118, 120, 124, and 126, such as upper limits on the amount of time or delay for communicating data between or among the devices 104, 118, 120, 124, and 126. The QoS parameters 132 may, for example, indicate whether transmission of a data frame will be scheduled or "best effort;" and if the data frame is scheduled, the QoS may also indicate a maximum acceptable latency in transmission.

In one or more embodiments, the QoS parameter 132 may dictate a lower limit or minimum on data throughput in communication between or among two or more devices 104, 118, 120, 124, and 126. In one or more embodiments, the QoS parameter 132 may be used to ensure that data communicated with one or more devices 104, 118, 120, 124, and 126, to one or more devices 104, 118, 120, 124, and 126, and/or between two or more devices 104, 118, 120, 124, and 126 is received in a timely manner (e.g., at designated times or within designated time periods). In one or more embodiments, the QoS parameter 132 may be defined by one or more other parameters. Examples of these other parameters may include a deadline parameter, a latency parameter, and/or a transport priority parameter.

The deadline parameter may dictate an upper limit or maximum on the amount of time available to send and/or receive data associated with a particular topic, in one or more embodiments. In one or more embodiments, the deadline parameter may relate to the total time the data spends in an application, operating system and network. In one or more embodiments, the deadline parameter may be used to check the network latency (e.g., the network latency is required to be less than the deadline as an initial requirement for being valid). Data may be associated with a particular topic when the data is published by one or more designated devices (e.g., sensors measuring a particular characteristic of the installed product, such as speed, power output, etc.), then the data represents the particular characteristic (even if the data comes from different devices at different times), and/or is directed to the same device (e.g., the same actuator 126).

In one or more embodiments, the latency parameter may dictate an upper limit or maximum on a temporal delay in delivering data to a subscribing device 104, 118, 120, 124, and 126 of the data. For example, the sensors 118, 120 may publish data 122 representative of operations of the installed product, and the HMI/UI 124, actuator 126, and/or control system 104 may require receipt of the sensor data 122 within a designated period of time after the data 122 is published by the sensors 118, 120. For example, for a sensor 118 that communicates a temperature of a motor or engine reaching or exceeding a designated threshold indicative of a dangerous condition, the control system 104 and/or actuator 126 may need to receive this temperature within a designated period of time to allow the control system 104 and/or actuator 126 to implement a responsive action, such as decreasing a speed of the engine or motor, shutting down the engine or motor, etc. In one or more embodiments, the latency period may refer to the time the data spends in the network only. In one or more embodiments, the TSN 128 may only relate to a network portion of the delay (as opposed to delays in the application, and operating system portions)

In one or more embodiments, the transport priority parameter may indicate relative priorities between two or more of the devices 104, 118, 120, 124, and 126 to the network. Some devices 104, 118, 120, 124, and 126 may have higher priority than other devices 104, 118, 120, 124, and 126 to receive (or subscribe to) certain identified types or sources of data. Similarly, some devices 104, 118, 120, 124, and 126 may have higher priority than other devices 104, 118, 120, 124, and 126 to send (or publish) certain identified types or sources of data. Subscribing devices 104, 118, 120, 124, and 126 having higher priorities than other devices 104, 118, 120, 124, and 126 may receive the same data via the network from a source of the data prior to the lower-priority devices 104, 118, 120, 124, and 126. Publishing devices 104, 118, 120, 124, and 126 having higher priorities than other devices 104, 118, 120, 124, and 126 may send the data that is obtained or generated by the higher-priority devices 104, 118, 120, 124, and 126 into the network than lower-priority devices 104, 118, 120, 124, and 126.

In one or more embodiments, the QoS parameters 132 of the devices 104, 118, 120, 124, and 126 may be defined by one or more, or a combination, of the deadline parameter, latency parameter, and/or transport priority parameter. In one or more embodiments, the QoS parameters 132 may then be used to determine data transmission schedules within the TSN using the data distribution service 130. Data transmission schedules may dictate times at which data is communicated within the network at nodes along the path. The inventor notes that by providing times for the "nodes along the path," the schedule also suggests the path itself. However, the suggested path may not be obvious if there are many TSN flows taking common paths.

Figure 3:
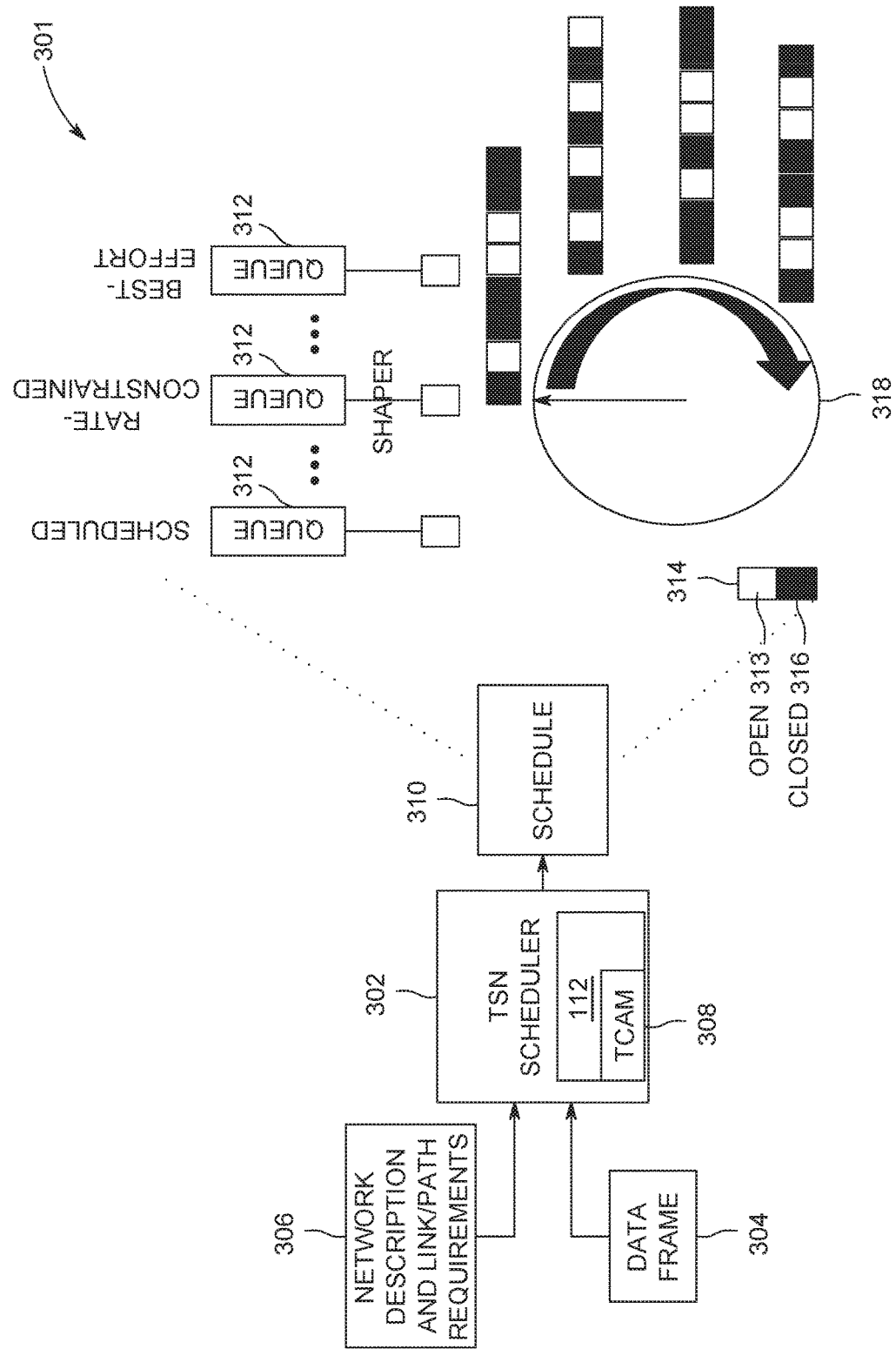
FIG. 3 illustrates a block diagram according to some embodiments.

Turning to FIGS. 2-3, a flow diagram and block diagram, of an example of operation according to some embodiments is provided. In particular, FIG. 2 provides a flow diagram of a process 200, according to some embodiments. Process 200, and any other process described herein, may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 100 is conditioned to perform the process 200 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow chart(s) described herein do not imply a fixed order to the steps, and embodiments of the present invention may be practiced in any order that is practicable.

Figure 4:
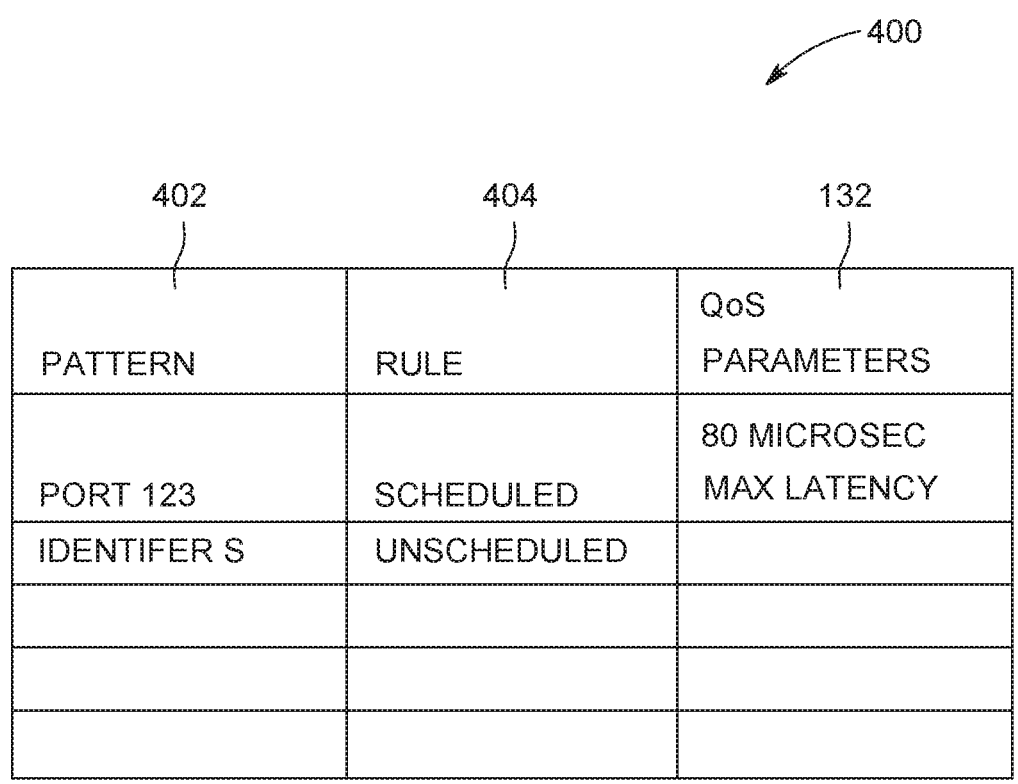
FIG. 4 illustrates a map according to some embodiments.

In one or more embodiments, prior to beginning process 200, a pattern data map 400 (FIG. 4) may be created to identify at least one pattern 402 that may occur in a data frame of a communication data packet, and where in the frame the pattern occurs. In one or more embodiments, the pattern data map 400 may also provide rules 404 for how the data frame should be transmitted through the network. In one or more embodiments, the pattern data map 400 may be used to dictate how and/or when data frames are communicated. In one or more embodiments, the patterns 402 and rules 404 populating the pattern data map 400 may be provided by one or more software application developers who create the applications executed by the control system 104. For example, the pattern may be an ETP port number (e.g., if the port number is 123, then this data frame is an unscheduled data frame and should be transmitted in an appropriately prescribed action). As another example, with respect to the publisher/subscriber process, when data is published by one or more designated devices (e.g., sensors measuring a particular characteristic of the installed product such as speed, power output, etc.) The data may be associated with a particular topic. The pre-defined "topic" may have a specific identifier tagged deep in the data frame, and this identifier may be the pattern in the pattern data map 400.

In one or more embodiments, the application developer may define distinct patterns in the existing code for a data frame and the QoS parameters 132 for that data frame. Of note, by having the application developer define distinct patterns in the code for existing applications in one or more embodiments, no changes need to be made to the application itself to categorize a data frame as scheduled or unscheduled. An advantage of mapping the patterns as described by one or more embodiments may be that communication streams and quality of service do not have to be tediously pre-configured at the application development level, which may save time, labor and reduces error. Another advantage of pattern mapping is that the network may adapt precisely to match the requirements of communication traffic requirements by changing rules and patterns, in the pattern data map, instead of changing the application code. Other advantages include the system may not have to be over-provisioned. As used herein, over-provisioning means reserving more routes/paths than necessary in case the network needs to use them due to some unanticipated change in the system. For example, setting up TSN flows between everyone for every possible latency requirement. This uses up network resources that may never really be utilized and requires a larger more expensive network that may not be needed except for rare cases. The inventor notes it may be preferable to only configure what is required at each instant in time, that is, dynamically change the configuration as needed to match what is required by the control system, as provided by one or more embodiments.

As described above, the TSN network 128 may allow for the transmission of both classes of communication (e.g., scheduled and best effort/random) in the same network. Conventionally, when a data frame is received in a TSN network, there may be no indication of whether the frame is a scheduled frame or an unscheduled frame. In some instances, the application may mark the data frame as a scheduled frame, and may provide schedule information, but this may not always be the case. Further, there may be several different methods to mark the data frame, but it is not always evident which method is being used.

In one or more embodiments, a scheduler 302 may schedule both classes of communication traffic through the network 128. In one or more embodiments, the network 128 may include a plurality of destinations or nodes. The nodes may be connected to the communication system via one or more communication paths or links. The communication links may be connected to each other via ports and/or switches. In one or more embodiments, two or more data frame transmission paths or flows may overlap. Data frames may collide where these transmission paths overlap, and collisions may result in the frames being dropped and not delivered to their respective destinations. As such, the scheduler 302 may fit the unscheduled/best effort frames into a schedule with the scheduled frames, so that the data frames do not collide and instead reach the appropriate destination at an appropriate time.

Initially, at S210, one or more data packets, made of one or more data frames 304, are received at a TSN module 112 within the scheduler 302 at a switch 301. While FIG. 3 shows the scheduler 302 located at the switch 301, the scheduler 302 may reside anywhere within the network 128. In one or more embodiments, the scheduler 302 may communicate with all switches and end systems (e.g., devices of the installed product) to configure them. In one or more embodiments, the TSN module 112 may include a Ternary Content Addressable Memory (TCAM) 308. The TCAM 308 may be defined to operate on a specific physical port, a set of ports, or all of the ports in a network. In one or more embodiments, the TCAM 308 may receive the data packet from one or more devices 104, 118, 120, 124 and 126 and may divide the packet into the one or more data frames 304. In one or more embodiments, each data frame may be temporarily placed in the TCAM 308, where one or more rules are applied to the frame, before the frame is moved out of the TCAM 308 to an appropriate transmission queue 312, as described further below. In one or more embodiments, the TCAM 308 may compare an arrival time of the data frame at the TCAM 308 to an expected arrival time window for the data frame. In one or more embodiments, when the data frame arrives outside the expected arrival time window, the data frame may be flagged as having an error or as having been subject to a potentially malicious action. In one or more embodiments, when the data frame arrives outside the expected arrival time window, the data frame may be dropped. In one or more embodiments, when the data frame arrives outside the expected arrival time window, the data frame may be subject to other suitable user-defined actions.

In one or more embodiments, the scheduler 302 may also receive a network topology description and path or link requirements 306 (e.g., an indication of time sensitive paths, maximum latencies, physical link bandwidths, size of frames ("payload"), and frame destination) from an application 111 (FIG. 1) and/or toolchain, or any other suitable source. As described below, in one or more embodiments if a feasible schedule cannot be created, then an error may be sent back to the application/toolchain. The inventor notes that, as provided by one or more embodiments, reducing frame size or allowing a longer latency may increase the likelihood of finding a feasible schedule. The inventor further notes that the relationship between maximum latencies, links/path and frame size may also be dependent upon the network topology, and may be referred to as an "NP-complete" problem.

Then at S212 a determination is made whether each received data frame 304 includes a pattern that matches, or substantially matches, a pattern 402 in the pattern data map 400. In one or more embodiments, the TCAM 308 may analyze each data frame 304 to determine whether any patterns from the pattern data map 400 exist in the data frame 304. Conventionally, the Ethernet data frame is standardized and includes a header with reserved fields that may not include any TSN information. The header may include a destination address, a source address and an Ether type. In one or more embodiments, the data frame may also include data (e.g., payload (e.g., IP, ARP) and a CRC Checksum.

In one or more embodiments, the TCAM 308 may search deeper within the frame than the Ethernet header for a pattern. For example, the TCAM 308 may search the Internet Protocol (IP) header or payload itself for a pattern. In one or more embodiments, the TSN scheduler 302 may configure the TCAM 308 as part of the scheduling process so that frame identifiers may be set as time-sensitive or best effort. In one or more embodiments, the application may indicate where to look in the frame for the pattern. In one or more embodiments, a packet analyzer (e.g., Wireshark®) may analyze the frame to determine a pattern location. In one or more embodiments, the TSN scheduler 302 may include an "active network" feature, whereby the TSN scheduler 302 may learn to determine a pattern location without a specific instruction.

In one or more embodiments the pattern in the data frame 304 may exactly match the pattern in the pattern data map 400 for the TCAM 308 to determine a "pattern match" (e.g., the pattern in the data frame matches the pattern in the pattern data map). In one or more embodiments, the pattern in the data frame 304 may substantially but not exactly match the pattern in the pattern data map 400 for the TCAM to determine a "pattern match." In one or more embodiments, a threshold may be applied to determine whether a data frame that does not exactly match the pattern in the pattern data map 400 may still be considered a pattern match. For example, the threshold may be 20% such that if a pattern in a data frame matches 80% or more of the pattern in the pattern data map 400, the pattern in the data frame is a pattern match. Other suitable thresholds may be used. In one or more embodiments, the threshold may be set by an administrator or an application developer or other suitable party.

If the received data frame 304 does not include any pattern matches, the process proceeds to S214 and the frame may be treated as "best effort" traffic in one or more embodiments. In one or more embodiments, if the received data frame 304 does not include any pattern matches, the data frame may be dropped in S214. In one or more embodiments, when a data frame 304 has an inappropriate pattern (e.g., a pattern that does "hit" i.e. match any filters in the TCAM), the data frame 304 may be flagged as having an error or as having been subject to a potentially malicious action. In one or more embodiments, the data frame may be dropped and not put through the system and/or an administrator may be alerted. Other suitable user-defined actions may be taken.

If the received data frame 304 does include a pattern match, the process proceeds to S216 and a classification is determined for each received data frame 304 with a pattern match, in one or more embodiments. In one or more embodiments, each received data frame 304 may be classified as scheduled or unscheduled. In one or more embodiments, the TSN module 112 inserts classification data into the reserved fields of the Ethernet header to indicate whether the data frame is unscheduled or scheduled, and if it is scheduled, the field includes an indication of which flow or queue to send the data frame to. In one or more embodiments, the queues may be assigned a priority; higher priority queues receive service before lower-priority queues. If a frame is unscheduled, it may go into the lowest priority queue.

Then in S218 a schedule 310 is generated. In one or more embodiments, the schedule may include a transmission time for the unscheduled data frames in relation to a transmission time for the scheduled data frames. As used herein, the transmission time may be an offset from a period, where the period may be defined as part of the schedule. In one or more embodiments, the period may continuously repeat, and the transmission time may be a precise offset within the period. In one or more embodiments, the schedule 310 may be based on the rules associated with the particular pattern in the pattern data map 400 as well as the network topology description and path or link requirements 306. In one or more embodiments, the transmission time for the scheduled data frames is based on an upper limit on a delay in transmitting the data (maximum transmission latency). In one or more embodiments, the schedule 310 may include the frame transmission times (e.g., the time a gate will open to release the data frame, as described below, for transmission to a given destination node.). In one or more embodiments, the determined communication pathway for each data frame avoids contention with each other. The schedule 310 may include other suitable information. In one or more embodiments, the pattern data map 400 may include a hierarchy of rules whereby if multiple patterns are detected, the rules having a higher priority may be applied to the data frame. For example, if a pattern is a UDP Source or Destination Port Number, a rule may be to place the frame in a particular TSN flow identified by the sender mac-address and a unique TSN flow number, e.g. XX:XX:XX:XX.1, where X is an Ethernet address (as in 08:56:27:6f:2b:9c).

In one or more embodiments, different sets of rules may be applied based on a determined level of analysis of the content of the data frame. Similar to the hierarchy of rules described above, the TCAM 308 may search different levels of the data frame 304 based on anything in the frame but may be with respect to a hardware dependent depth limit into the frame. Examples include, Internet Protocol addresses, header values, DSCP (IP level priority code point), and application data such as the topic of conversation in the frame. The TCAM may also look at the entropy of the frame (e.g., the degree of randomness of the data) to classify the type of frame. In particular, entropy may relate to a degree of compression of the frame. For example, with executable data, the binary output of a processor may be complex and may then be hard to compress; it may have a lower degree of compression. A text document, on the other hand, may be comparatively simpler and then easy to compress; it may have a higher degree of compression. In one or more embodiments a threshold may be used to determine whether the degree of compression correlates to a best-effort classification or a time-sensitive classification.

In one or more embodiments, the TSN network 128 may include a plurality of queues 312 (e.g., Queue 0, 1, 2, 3, 4 . . . 7, etc.) for transmitting the data frames 304 to their respective destinations. In one or more embodiments the queues 312 may be prioritized, with Queue 0 being the lowest priority and Queue 7 being the highest priority, for example. In one or more embodiments, scheduled data frames may be given a highest priority, while unscheduled/best effort data frames may be given a lower priority. In one or more embodiments, rate-constrained data frames may be assigned a priority between the scheduled data frames and the unscheduled/best effort data frames. As used herein, rate-constrained traffic is somewhere between scheduled and best effort. Rate-constrained traffic is not scheduled, but its throughput may still be controlled such that bursts of traffic are spread over a wider interval and congestion is reduced. In other words, the traffic may be "shaped" so that its rate follows a pre-configured distribution. In one or more embodiments, each queue 312 may include a gate 313 that may be open 314 or closed 316, and may only allow transmission of a data frame at the scheduled time by opening and closing per the schedule. In one or more embodiments, the scheduler 302 may assign each data frame 304 to a particular queue 312 based on a priority associated therewith. In one or more embodiments, the scheduler 302 may assign each data frame 304 to a particular queue 312 based on other criteria. Then the gate 313 for each queue 312 may be opened and closed to allow the flow of data frames 304 based on the schedule 310, such that more than one frame is not output from the collection of queues 312 at a time. For example, the gate on Queue 1 may be closed while the gate for Queue 3 is open and the data frame 304 is transmitted from Queue 3. As described above, when a data frame 304 is output from more than one queue 312 at the same or substantially the same time, the data frames may collide and destroy themselves. In one or more embodiments, the operation of the queue gates may be synchronized to a same clock 318. Of note, the synchronization is important, especially for high priority traffic, to make sure the gates are closed at precisely the right time to avoid collision and to get the data frame through the network in the required latency period (within the maximum latency as set as an input to the scheduler 302).

Turning back to the process, in S220 the schedule 310 is transmitted. In one or more embodiments, the schedule 310 may be downloaded onto all of the devices 104, 118, 120, 124, and 126 and switches in the network 128.

Then in S222, the schedule 310 is executed and the one or more data frames 304 are transmitted through the network 128 based on the schedule 310. And then in S224, one or more operations of the installed product may be controlled based on the transmitted data frames. For example, as described above, the locomotive or rail vehicle system now may apply its brakes early enough to avoid a collision based on the transmitted data frames.

In one or more embodiments, the schedule 310 may dynamically change while the schedule 310 is being executed. For example, with respect to a feedback control system, the system may be tasked with maintaining a stability of the system, and may make changes to the maximum latency input, for example. These changes may be fed back to the scheduler 302 to dynamically change the maximum acceptable latency for at least one particular data frame(s) in an application, which in turn may change the schedule 310 as the schedule 310 is being executed.

Figure 5:
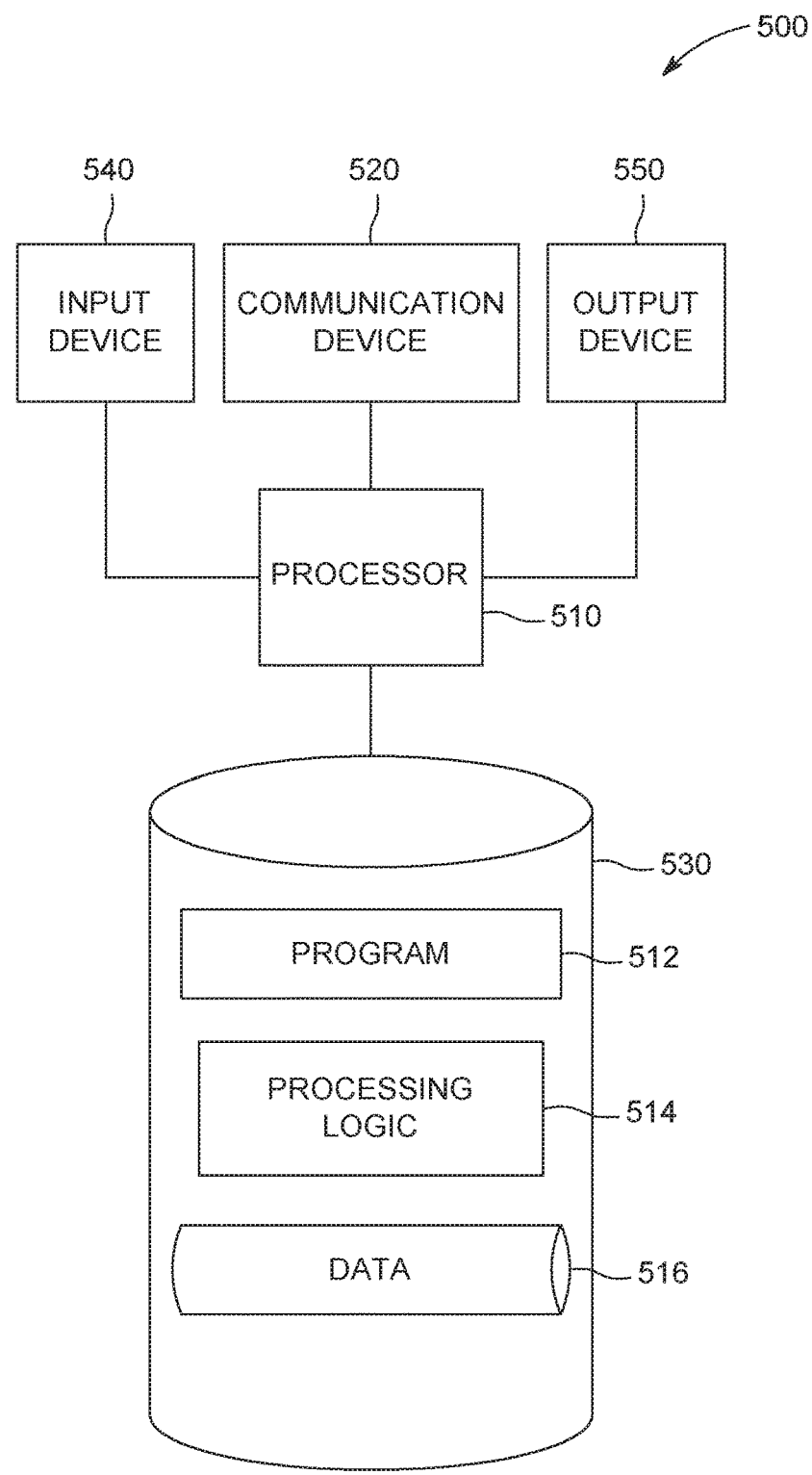
FIG. 5 illustrates a block diagram of a system according to some embodiments.

Note the embodiments described herein may be implemented using any number of different hardware configurations. For example, FIG. 5 illustrates a TSN communication traffic content platform 500 that may be, for example, associated with the system 100 of FIG. 1. The TSN communication traffic content platform 500 comprises a TSN communication traffic content processor 510 ("processor"), such as one or more commercially available Central Processing Units (CPUs) in the form of one-chip microprocessors, coupled to a communication device 520 configured to communicate via a communication network (not shown in FIG. 5). The communication device 520 may be used to communicate, for example, with one or more users. The TSN communication traffic content platform 500 further includes an input device 540 (e.g., a mouse and/or keyboard to enter information) and an output device 550 (e.g., to output and display the assessment and recommendation).

The processor 510 also communicates with a memory/storage device 530. The storage device 530 may comprise any appropriate information storage device, including combinations of magnetic storage devices (e.g., a hard disk drive), optical storage devices, mobile telephones, and/or semiconductor memory devices. The storage device 530 may store a program 512 and/or TSN communication traffic content processing logic 514 for controlling the processor 510. The processor 510 performs instructions of the programs 512, 514, and thereby operates in accordance with any of the embodiments described herein. For example, the processor 510 may receive data and then may apply the instructions of the programs 512, 514 to determine a schedule for the transmission of the data frames.

The programs 512, 514 may be stored in a compressed, uncompiled and/or encrypted format. The programs 512, 514 may furthermore include other program elements, such as an operating system, a database management system, and/or device drivers used by the processor 510 to interface with peripheral devices.

As used herein, information may be "received" by or "transmitted" to, for example: (i) the platform 500 from another device; or (ii) a software application or module within the platform 500 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors 510 (FIG. 5). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A method comprising:
receiving one or more data frames at a Time Sensitive Network (TSN) module; determining a classification for each data frame via the TSN module;
generating a schedule for the one or more data frames to transmit the data frame through a communication network based on the classification, wherein the communication network is a deterministic Ethernet configured as a time sensitive network (TSN), and wherein the TSN module inserts classification data into at least one reserved field of an Ethernet header to indicate whether the one or more data frames is unscheduled or scheduled, and if the one or more data frames is scheduled, the TSN module inserts a further indication into the at least one reserved field, the further indication comprises at least one queue to send the one or more data frames to;
transmitting the one or more data frames based on the schedule; and
controlling one or more operations of an installed product based on the transmitted one or more data frames.

2. The method of claim 1, wherein the TSN comprises at least one digital twin.

3. The method of claim 2, wherein the TSN module includes a Ternary Content Addressable Memory (TCAM), and
wherein the TSN utilizes the at least one digital twin to create a prediction that is transmitted to the installed product.

4. The method of claim 2, wherein determining the classification for each data frame further comprising:
determining a presence of at least one pattern in the data frame.

5. The method of claim 3, further comprising, prior to receiving one or more data frames at the TSN module:
receiving a pattern data map at the TCAM, wherein the pattern data map identifies one or more patterns included in one or more data frames.

6. The method of claim 5, wherein determining the presence of the at least one pattern in the data frame further comprises:
comparing data in the data frame to the pattern data map via the TCAM at the TSN module, and
wherein the TCAM divides at least one packet into the one or more data frames.

7. The method of claim 6, wherein each draft frame is classified as one of a scheduled data frame or an unscheduled data frame, and
wherein the TCAM searches at least one of an Internet Protocol (Ip) header and a transmission payload for the at least one pattern.

8. The method of claim 7, wherein the classification is based on an entropy of the data frame.

9. The method of claim 7, wherein generating a schedule further comprises:
generating a transmission time for the unscheduled data frames in relation to transmission time for the scheduled data frames.

10. The method of claim 9, wherein the transmission time for the scheduled data frames is based on an upper limit on a delay in transmitting the data.

11. The method of claim 9, wherein the generated transmission time for each data frame avoids convention with each other, and
wherein the one or more data frames comprises a CRC Checksum.

12. The method of claim 10, wherein the transmitted data frame is operative to control operations of the installed product via a software-defined network control system, the method further comprising:
utilizing, at the communication network, at least one quality of service (QoS) parameter to maintain a time-sensitive networking quality of service, wherein the QoS parameter comprises at least one of a latency parameter, a deadline parameter, and a transport priority parameter.

13. The method of claim 2, wherein the installed product is one of a vehicle, one or more medical devices, and a power-generating facility.

14. A system comprising:
an installed product, including a plurality of components;
a computer programmed with a Time Sensitive Network (TSN) module for the installed product, the TSN module for controlling operations of the installed product;
the computer including a processor and a memory in communication with the processor, the memory storing the TSN module and additional program instructions, wherein the processor is operative with the TSN module and additional program instructions to perform functions as follows:
receiving one or more data frames at a Time Sensitive Network (TSN) module;
determining a classification for each data frame via the TSN module;
generating a schedule for the one or more data frames to transmit the data frame through a communication network based on the classification, wherein the communication network is a deterministic Ethernet configured as a time sensitive network (TSN), and
wherein the TSN module inserts classification data into at least one reserved field of an Ethernet header to indicate whether the one or more data frames is unscheduled or scheduled, and if the one or more data frames is scheduled, the TSN module inserts a further indication into the at least one reserved field, the further indication comprising at least one queue to send the one or more data frames to;
transmitting the one or more data frames based on the schedule; and
controlling one or more operations of the installed product based on the transmitted one or more data frames.

15. The system of claim 14, further comprising at least one sensor communicatively coupled to the communication network,
wherein the at least one sensor comprises at least one of an x-ray detector an acoustic pick-up device, a tachometer, and a global positioning system receiver.

16. The system of claim 15, wherein the TSN module includes a Ternary Content Addressable Memory (TCAM), the installed product comprising at least one actuator,
wherein the at least one actuator comprises at least one of brakes, throttles, robotic devices, medical imaging devices, lights, and turbines, and
wherein the at least one actuator communicates at least one status of the installed product to the communication network.

17. The system of claim 16, wherein a presence of at least one pattern in the data frame is determined to classify each data frame, and
wherein the at least one pattern comprises at least one port number.

18. The system of claim 17 wherein the presence of the at least one pattern is determined based on a comparison of data in the data frame to a pattern data map received at the TCAM of the TSN, and
wherein the communication network matches at least one communication traffic requirement by changing at least one pattern in the pattern data map.

19. The system of claim 16, wherein each data frame is classified as one of a scheduled data frame or an unscheduled data frame,
the system further comprising at least one sensor communicatively coupled to the communication network, wherein the at least one sensor comprises at least one camera.

20. The system of claim 19, wherein generating a schedule further comprises:
generating a transmission time for the unscheduled data frames in relation to transmission time for the scheduled data frames.

21. The system of claim 20, wherein the transmission time for the scheduled data frames is based on an upper limit on a delay in transmitting the data.

22. The system of claim 20, wherein the generated transmission time for each data frame avoids contention with each other.

23. The system of claim 14, wherein the installed product is one of a vehicle, one or more medical devices, and a power-generating facility.

24. A non-transitory, computer-readable medium storing instructions that, when executed by a computer processor, cause the computer processor to perform a method comprising:
receiving one or more data frames at a Time Sensitive Network (TSN) module;
determining a classification for each data frame via the TSN module;
generating a schedule for the one or more data frames to transmit the data frame through a communication network based on the classification, wherein the communication network is a deterministic Ethernet configured as a time sensitive network (TSN), and
wherein the TSN module inserts classification data into at least one reserved field of an Ethernet header to indicate whether the one or more data frames is unscheduled or scheduled, and if the one or more data frames is scheduled, the TSN module inserts a further indication into the at least one reserved field, the further indication comprising at least one queue to send the one or more data frames to;
transmitting the one or more data frames based on the schedule; and controlling one or more operations of an installed product based on the transmitted one or more data frames.

25. The medium of claim 24, wherein the deterministic Ethernet network is configured as the time sensitive network (TSN) hosted within a scheduler comprising a switch, and wherein the one or more data frames are received at the switch.

26. The medium of claim 24, wherein the TSN module includes a Ternary Content Addressable Memory (TCAM), and
wherein the scheduler receives at least one network topology description.

27. The medium of claim 26, wherein determining the classification for each data frame further comprises:
determining a presence of at least one pattern in a content of the data frame, wherein each data frame of the one or more data frames is temporarily placed in the TCAM where one or more rules are applied to each data frame, and
wherein each data frame of the one or more data frames is subsequently removed from the TCAM and placed in at least one transmission queue.

28. The medium of claim 26, wherein the installed product is one of a vehicle, one or more medical devices, and a power-generating facility, and wherein the TCAM compares an arrival time of the one or more data frames at the TCAM to an expected arrival time window for the one or more data frames.

* * * * *